United States Patent
Sawert et al.

(10) Patent No.: US 6,951,131 B2
(45) Date of Patent: Oct. 4, 2005

(54) FUEL LEVEL INDICATION ASSEMBLY

(75) Inventors: Ulf Sawert, Grand Blanc, MI (US); Hugh Wesley Ireland, Flushing, MI (US); Michael D. Lutton, Grand Blanc, MI (US); Mark K. Wolfenden, Burton, MI (US); Daniel Alexander Crawford, Burton, MI (US)

(73) Assignee: Delphi Technologies, Inc., Troy, MI (US)

( * ) Notice: Subject to any disclaimer, the term of this patent is extended or adjusted under 35 U.S.C. 154(b) by 17 days.

(21) Appl. No.: 10/655,100

(22) Filed: Sep. 4, 2003

(65) Prior Publication Data

US 2004/0079149 A1 Apr. 29, 2004

Related U.S. Application Data

(60) Provisional application No. 60/408,626, filed on Sep. 6, 2002.

(51) Int. Cl.⁷ .............................................. G01F 23/28
(52) U.S. Cl. ................... 73/290 V; 73/290 R
(58) Field of Search ........................... 73/290 V, 290 R

(56) References Cited

U.S. PATENT DOCUMENTS

| | | | | |
|---|---|---|---|---|
| 4,474,061 A | * | 10/1984 | Parker ......................... 73/149 |
| 4,535,627 A | * | 8/1985 | Prost et al. ............... 73/290 B |
| 4,744,863 A | * | 5/1988 | Guckel et al. ................ 438/53 |
| 4,811,595 A | * | 3/1989 | Marciniak et al. ............ 73/149 |
| 4,815,323 A | * | 3/1989 | Ellinger et al. ........... 73/290 V |
| 4,853,669 A | * | 8/1989 | Guckel et al. ................. 338/4 |
| 4,945,276 A | * | 7/1990 | Mylvaganam et al. ...... 310/326 |
| 4,991,433 A | * | 2/1991 | Warnaka et al. .......... 73/290 V |
| 5,043,912 A | * | 8/1991 | Reus ............................ 702/54 |
| 5,095,748 A | * | 3/1992 | Gregory et al. ........... 73/290 V |
| 5,586,085 A | * | 12/1996 | Lichte ......................... 367/99 |
| 5,914,507 A | * | 6/1999 | Polla et al. ................. 257/254 |
| 5,996,407 A | * | 12/1999 | Hewitt ..................... 73/290 V |
| 6,500,574 B2 | | 12/2002 | Keegan ....................... 429/23 |
| 6,564,631 B1 | | 5/2003 | Lake et al. ................... 73/313 |
| 6,581,459 B1 | * | 6/2003 | Lichtenfels, II ........... 73/290 V |
| 6,598,473 B2 | * | 7/2003 | Atkinson ................. 73/290 V |
| 2001/0010171 A1 | * | 8/2001 | Atkinson ................. 73/290 V |
| 2001/0035700 A1 | * | 11/2001 | Percin et al. ............... 310/324 |

OTHER PUBLICATIONS

"MEMS Reshaping Ultrasonic Sensing" by Andrew Cittadine of Sensant Corp., Feb. 2000 issue of SENSORS magazine; reference cited by applicant in the disclosure, article pulled from the website http://www.sensormag.com/articles/0200/17/index.htm.*

IEEE Transactions on Ultrasonics, FerroElectrics, and Frequency control, vol. 5, No. 3, May 1998 Surface Micromachined Capacitive Ultrasonic Transducers.

* cited by examiner

Primary Examiner—Hezron Williams
Assistant Examiner—Rodney Frank
(74) Attorney, Agent, or Firm—Jimmy L. Funke

(57) ABSTRACT

A fuel level indication assembly for a fuel tank includes at least one ultrasonic sensor having a drum to emit and receive a sonic signal. The at least one ultrasonic sensor is adapted to be disposed in either one of a liquid fuel and a fuel vapor/air space within the fuel tank to measure a level of liquid fuel within the fuel tank.

20 Claims, 3 Drawing Sheets

FUEL LEVEL INDICATION ASSEMBLY

CROSS-REFERENCE TO RELATED APPLICATION(S)

The present application claims the priority date of copending U.S. Provisional Patent Application Ser. No. 60/408,626, filed Sep. 6, 2002.

TECHNICAL FIELD

The present invention relates generally to fuel tanks for vehicles and, more particularly, to a fuel level indication assembly for a fuel tank of a vehicle.

BACKGROUND OF THE INVENTION

It is known to provide a fuel tank in a vehicle to hold fuel to be used by an engine of the vehicle. It is also known to provide a fuel sensor or indicator in the fuel tank to indicate the level of liquid fuel in the fuel tank. Typically, the fuel indicator includes a variable resistor operatively connected to structure of a fuel delivery module and a wiper assembly pivotally connected to the structure for engaging the variable resistor. The wiper assembly has one end connected to a float to rotate the wiper assembly relative to the variable resistor based on a level of liquid fuel in the fuel tank.

Typically, the fuel indicators are analog devices that measure liquid fuel height or fuel level through a position change by a float arm that is connected to the fuel indicator. The position change is a change in resistive measurement by the fuel indicator to indicate a change in the fuel level. However, the sliding contacts of the fuel indicator are impacted with changes in the fuel. The impact of the various chemicals within the fuel can cause contact resistance that translates into a "signal noise" or open contacts. Since the composition of fuel is constantly changing, it is desirable to eliminate sliding contacts exposed to fuel for the fuel indicator. A number of technologies exist which eliminate sliding contacts. These technologies include inductance and Hall effect sensors. However, it is also desirable to eliminate float arms or other moving parts of the fuel indicator.

To eliminate moving parts, the selection of technologies is limited to capacitance, optics, force gages (weight), and sonics (piezo electric). All of these technologies have disadvantages in indicating all of the available fuel due to various configurations of the fuel tanks, as well as to the unique environment presented by fuels consisting of "gasoline" and alcohols, both in liquid and vapor stage. For capacitance, the fuel indicator is affected by the conductivity of the fuel, stratification of the fuel, the coating of the capacitance element by organic and inorganic compounds, and the need to have electronics associated with the fuel indicator in close proximity thereto, i.e. inside the fuel tank. For fiber optics, the fiber optics in either the form of fiber optic strands or light pipes are affected by the variations in color of the fuel and by the tendency of the fiber optic or light pipe element to become coated with organic and inorganic compounds. For force/strain gage (weight), as the level of liquid fuel drops toward empty, the resolution becomes less and less until a point is reached where there is insufficient mass to produce a signal. For sonics, piezo electric crystals are normally positioned in close proximity to a bottom of the fuel tank since dynamic ranges of the crystals are such that the sonics created are more effective in liquid as compared to air. The piezo electric crystals provide good accuracy with the exception of a zone directly above the crystals, which is referred to as the "dead" zone. This zone is approximately 15 millimeters (mm) above the crystals where the crystals are unable to differentiate sufficiently between the emitted and received signals. In addition, stratification of alcohol blended fuels may impact the accuracy of the indicated fuel level.

All of the above-described technologies, without moving parts, are difficult to package within the fuel tank. It is also desirable to minimize the openings into the fuel tank to reduce fuel permeation, thus the fuel level device is normally assembled as part of the fuel delivery module. Depending on the location of the tank opening, these devices may not be able to indicate fuel levels higher than the location of the fuel delivery module permits.

Therefore, it is desirable to provide a fuel level indicator that eliminates sliding contacts exposed to fuel. It is also desirable to provide a fuel level indicator that eliminates moving parts. It is further desirable to provide a fuel level indicator that has a relatively low cost.

SUMMARY OF THE INVENTION

Accordingly, the present invention is a fuel level indication assembly for a fuel tank including at least one ultrasonic sensor having a drum to emit and receive a sonic signal. The at least one ultrasonic sensor is adapted to be disposed in either one of a liquid fuel and a fuel vapor/air space within the fuel tank to measure a level of liquid fuel within the fuel tank.

One advantage of the present invention is that a fuel level indication assembly is provided for a fuel tank of a vehicle. Another advantage of the present invention is that the fuel level indication assembly uses ultrasonic sensors to emit a sonic signal, which when reflected, is received by a sensor and measurements between outgoing and received pulses are interpreted into distances to measure a liquid fuel level in a fuel tank. Yet another advantage of the present invention is that the fuel level indication assembly incorporates microelectromechanical (MEM) ultrasonic sensors and micromachined capacitive ultrasonic transducer (MUT) ultrasonic sensors to measure a level of liquid fuel in a fuel tank. Still another advantage of the present invention is that the fuel level indication assembly eliminates sliding contacts exposed to fuel and eliminates moving parts. A further advantage of the present invention is that the fuel level indication assembly incorporates ultrasonic sensors as a single sensor option when cost rather than accuracy is required. Yet a further advantage of the present invention is that the fuel level indication assembly incorporates MEM or MUT ultrasonic sensors that allow for superior performance than piezo electric crystals in comparable situations.

Other features and advantages of the present invention will be readily appreciated, as the same becomes better understood, after reading the subsequent description taken in conjunction with the accompanying drawings.

DESCRIPTION OF THE PREFERRED EMBODIMENT

Figure 1:
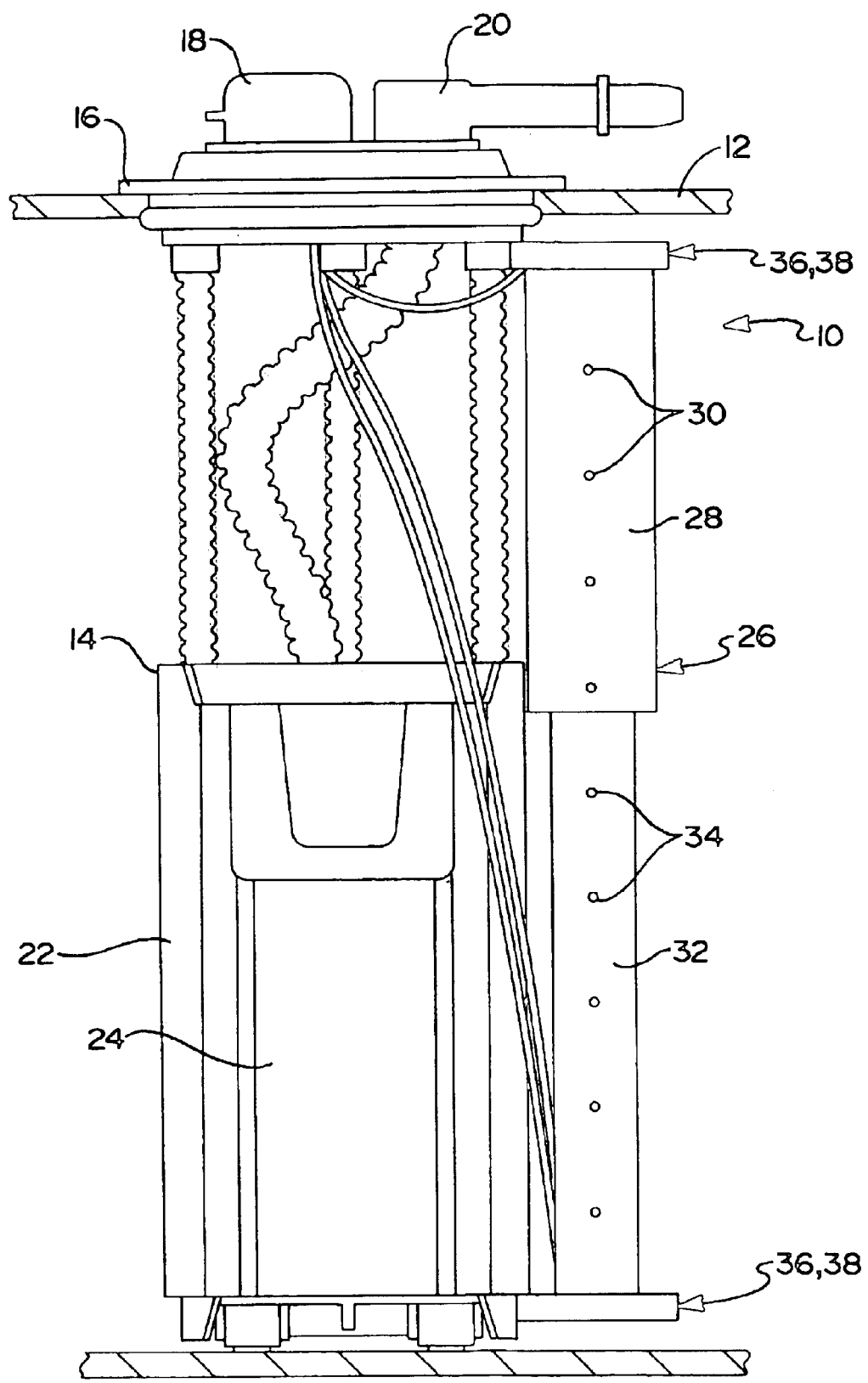
FIG. 1 is a fragmentary elevational view of a fuel level indication assembly, according to the present invention, illustrated in operational relationship with a fuel tank.

Referring to the drawings and in particular FIG. 1, one embodiment of a fuel level indication assembly 10, according to the present invention, is shown for a fuel tank 12 (partially shown) of a vehicle (not shown). The fuel tank 12 includes a fuel delivery module 14 therein with a removable cover 16 sealed to the top of the fuel tank 12 and having an electrical connector 18 and a fuel line outlet connector 20. The fuel delivery module 14 also includes a fuel reservoir 22 that contains an electrical fuel pump 24 electrically connected to the electrical connector 18 and fluidly connected to the fuel line outlet connector 20. The fuel delivery module 26 further includes the fuel level indication assembly 10 to indicate a liquid fuel level in the fuel tank 12. It should be appreciated that, except for the fuel level indication assembly 10, the fuel tank 12 and fuel delivery module 14 are conventional and known in the art.

Figure 2:
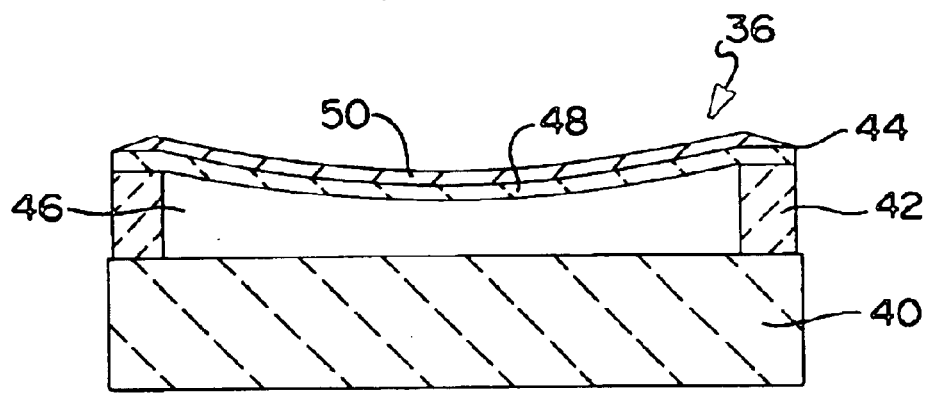
FIG. 2 is a fragmentary elevational view of an ultrasonic sensor of the fuel level indication assembly of FIG. 1.

Referring to FIGS. 1 and 2, the fuel level indication assembly 10 may include a slosh or guide housing, generally indicated at 26, for connection to the fuel delivery module 14. The guide housing 26 has a top or first tube 28 attached to the cover 16. The first tube 28 has at least one, preferably a plurality of apertures 30 extending therethrough and spaced axially therealong to allow fuel to enter. The guide housing 26 has a bottom or second tube 32 attached to the fuel reservoir 22. The second tube 32 is telescopingly received within the first tube 28. The second tube 32 has at least one, preferably a plurality of apertures 34 extending therethrough and spaced axially therealong to allow fuel to enter.

The fuel level indication assembly 10 includes at least one, preferably a plurality of ultrasonic sensors, generally indicated at 36 and 38. Preferably, one of the ultrasonic sensors 36 and 38 is mounted within the first tube 28 and another one of the ultrasonic sensors 36 and 38 is mounted within the second tube 32. The ultrasonic sensors 36 and 38 are electrically connected via the electrical connector 18 to an electronic controller (not shown). The ultrasonic sensors 36 and 38 emit a sonic signal, which when reflected, is received by the sensor 36 and 38, wherein measurements between outgoing and received pulses are interpreted into distances by the controller to indicated a fuel level in the fuel tank 12. It should be appreciated that the guide housing 26 minimizes the changes in the indicated liquid fuel level due to the fuel dynamics within the fuel tank 12 under driving conditions.

In one embodiment illustrated in FIG. 2, the ultrasonic sensor 36 is of a microelectromechanical (MEM) type. The ultrasonic sensor 36 has a substrate 40. The substrate 40 is made of a silicon material, such as a silicon wafer. The substrate 40 acts as a bottom electrode. The ultrasonic sensor 36 also has a support 42 operatively supported by the substrate 40. The support 42 is made of a silicon material, preferably silicon nitride. The ultrasonic sensor 36 further has a drum 44 operatively supported by the support 42 to form a vacuum cavity 46 between the substrate 40, support 42, and the drum 44. The drum 44 has a suspended membrane 48 that is relatively thin and made of a silicon material, preferably silicon nitride. The drum 44 also includes a top electrode 50 disposed over the suspended membrane 48. The top electrode 50 is made of a conductive metal material, preferably aluminum. The ultrasonic sensor 36 is of a type disclosed in an article written by Andrew Cittadine of Sensant Corporation, in the February 2000 issue of a publication, entitled "Sensors", the disclosure of which is hereby incorporated by reference. It should be appreciated that the drum 44 is a capacitive structure that operates under an applied electrostatic field.

The ultrasonic sensor 36 is effective in both air and liquid. The ultrasonic sensor 36 has a 110 decibels (dB) dynamic range, defined as the ratio of the amplitude of the strongest measurable signal to that of the noise floor. The drum 44 of the ultrasonic sensor 36 provides a 50 dB better dynamic range in air than piezo electric crystals. The ultrasonic sensor 36 can operate at frequencies of approximately 200 kilohertz (kHz) to 5 megahertz (MHz), which are higher frequencies than piezo electric crystals. It should be appreciated that the higher frequencies result in up to ten times better timing and frequency resolution and up to a ten times reduction of the dead zone as compared to piezo electric crystals, thereby allowing the ultrasonic sensor 36 to be used in vapor dome applications. It should also be appreciated that the ultrasonic sensor 36 resembles tiny drums with a thin ultrasensitive nitride membrane 48 that vibrates to send and receive ultrasound. It should further be appreciated that the membrane 48 and substrate 40 form the top and bottom plates of a capacitor and changes in the voltage on the capacitor displaces the membrane 48, and displacements of the membrane 48 cause detectable changes in capacitance. It should still further be appreciated that the ultrasonic sensor 36 shows a single drum 44 in FIG. 2 and that the ultrasonic sensor 36 may include an array of drums 44.

Figure 3:
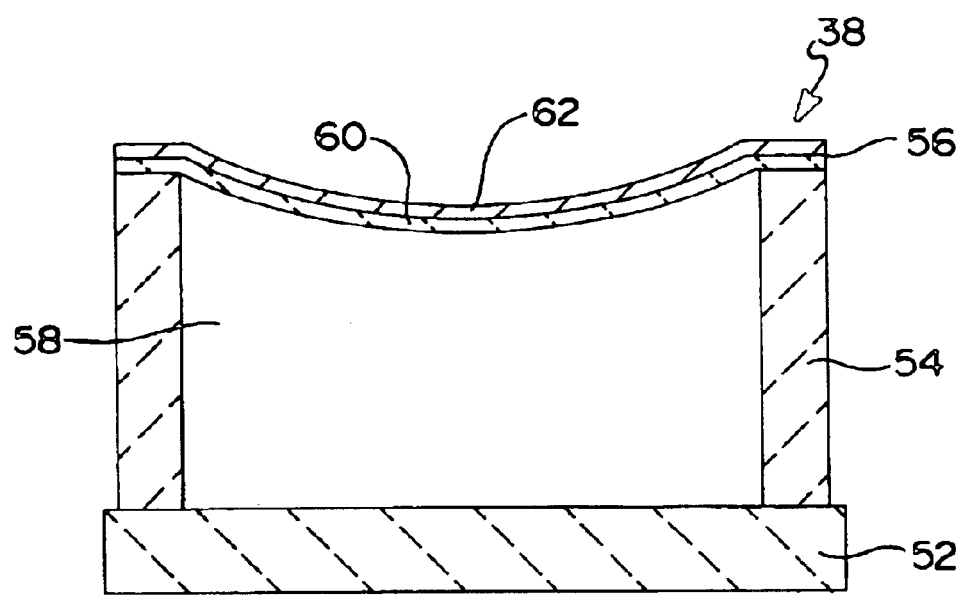
FIG. 3 is a fragmentary view of another ultrasonic sensor of the fuel level indication assembly of FIG. 1.

In another embodiment illustrated in FIG. 3, the ultrasonic sensor 38 is of a micromachined capacitive ultrasonic transducer (MUT) type. The ultrasonic sensor 38 has a substrate 52. The substrate 52 is made of a silicon material, such as a silicon wafer. The substrate 52 acts as a bottom electrode. The ultrasonic sensor 38 also has a support 54 operatively supported by the substrate 52. The support 54 is made of a silicon material, preferably silicon dioxide (SiO2). The ultrasonic sensor 38 further has a drum 56 operatively supported by the support 54 to form a vacuum cavity 58 between the substrate 52, support 54, and the drum 56. The drum 56 has a suspended membrane 60 that is relatively thin and made of a silicon material, preferably silicon nitride. The drum 56 also includes a top electrode 62 disposed over the suspended membrane 60. The top electrode 62 is made of a conductive metal material, preferably gold (Au). The ultrasonic sensor 38 is of a type disclosed in an article, Surface Micromachined Capacitive Ultrasonic Transducers, in the May 1998 issue of a publication, IEEE Transactions on Ultrasonics, Ferroelectrics, and Frequency Control, Vol. 45, No. 3, the disclosure of which is hereby incorporated by reference. It should be appreciated that the drum 56 is a capacitive structure that operates under an applied electrostatic field.

The ultrasonic sensor 38 is also effective in both air and liquid. The ultrasonic sensor 38 has a 110 decibels (dB) dynamic range, defined as the ratio of the amplitude of the strongest measurable signal to that of the noise floor. The drum 56 of the ultrasonic sensor 38 provides a 50 dB better dynamic range in air than piezo electric crystals. The ultrasonic sensor 38 can operate at frequencies of approximately 200 kilohertz (kHz) to 5 megahertz (MHz), which are higher frequencies than piezo electric crystals. It should be appreciated that the higher frequencies results in up to ten times better timing and frequency resolution and up to a ten times reduction of the dead zone as compared to piezo electric crystals, thereby allowing the ultrasonic sensor 38 to be used in vapor dome applications. It should be appreciated that the ultrasonic sensor 38 resembles tiny drums with a thin ultrasensitive nitride membrane that vibrates to send and receive ultrasound. It should also be appreciated that the membrane 60 and substrate 52 form the top and bottom plates of a capacitor and changes in the voltage on the capacitor displaces the membrane 60, and displacements of the membrane 60 cause detectable changes in capacitance. It should further be appreciated that the ultrasonic sensor 38 shows a single drum 56 in FIG. 3 and that the ultrasonic sensor 38 may include an array of these drums 56.

In operation, the fuel level indication assembly 10 includes two of the ultrasonic sensors 36 and 38 as illustrated in FIG. 1. The top mounted ultrasonic sensor 36,38 is optimized for frequency, etc., to operate in the fuel vapor/air space of the fuel tank 12. The bottom mounted ultrasonic sensor 36,38 is optimized to operate in liquid fuel. The signals from both the top mounted ultrasonic sensor 36,38 and bottom mounted ultrasonic sensor 36,38 can then be mathematically or electronically manipulated or combined to provide accurate indications of the liquid fuel level in the fuel tank 12. By combining the signals, any error in either signal is minimized. It should be appreciated that the effect of dead zones is minimized as well as the effect of foaming and stratification of the fuel. It should also be appreciated that, in liquid fuel applications, the mass of the membrane 48,60 is negligible relative to that of the liquid. It should further be appreciated that the improved bandwidth of the ultrasonic sensors 36 and 38 reduces signal ringing and signal distortion, resulting in higher resolution for ranging applications.

Figure 4:
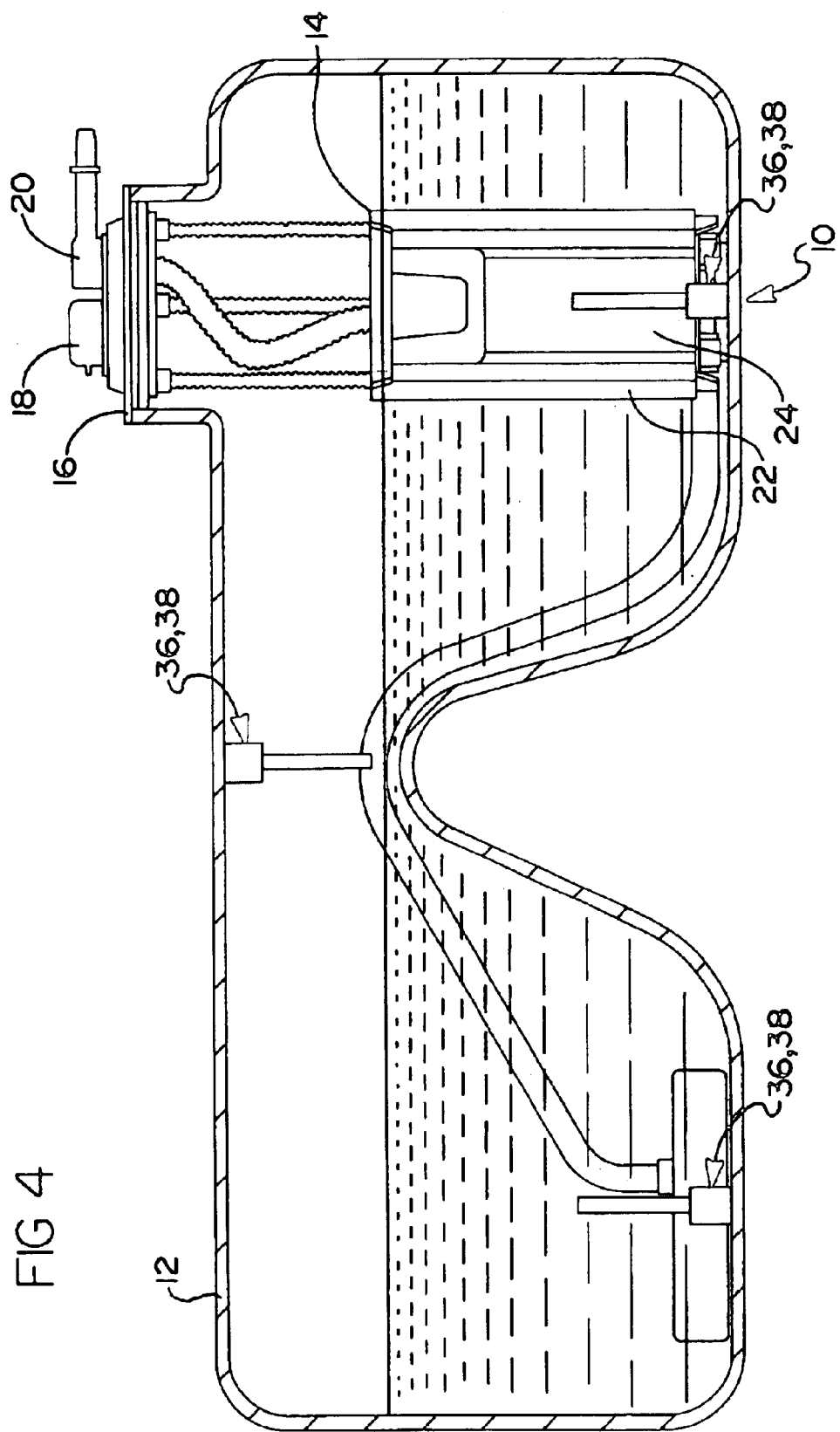
FIG. 4 is a fragmentary elevational view of the fuel level indication assembly of FIG. 1 illustrating an arrangement of the ultrasonic sensors in a fuel tank.

Referring to FIG. 4, the fuel level indication assembly 10 may be used with the fuel tank 12 to indicate liquid fuel levels within the fuel tank 12. In this embodiment, the fuel tank 12 is of a saddle type. Different types of sensors can be used to indicate the liquid fuel levels within the two sides of the fuel tank 12 as well as in portions of the fuel tank 12 where liquid fuel resides which cannot be indicated by the sensors in the general area of the tank opening for the fuel delivery module 14. In this embodiment, the fuel level indication assembly 10 includes a bottom mounted ultrasonic sensor 36,38, optimized for operation in liquid fuel, positioned in each of the sides of the fuel tank 12. The fuel level indication assembly 10 also includes a top mounted ultrasonic sensor 36,38, optimized for operation in air/fuel vapor, positioned above a center of the saddle to indicate the liquid fuel level above the top of the two bottom mounted ultrasonic sensors 36,38. The three signals from the ultrasonic sensors 36,38 can then be mathematically or electronically manipulated or combined by the controller to provide accurate indications of the liquid fuel level in the fuel tank 12. It should be appreciated that, in some applications, the optimum sensor selection for the fuel level indication assembly 10 may not only include the ultrasonic sensors 36,38, but may also include strain gage sensors (not shown) to take advantage of the characteristics of each of the sensors. It should also be appreciated that, when relatively low cost is required, the ultrasonic sensors 33,38 can be used as a single sensor, similar to that illustrated in FIG. 1, by utilizing either the top mounted ultrasonic sensor 36,38 optimized for air/fuel vapor operation or the bottom mounted ultrasonic sensor 36,38 optimized for fluid operation.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A fuel level indication assembly for a fuel tank comprising:
   at least one ultrasonic sensor having a drum to emit and receive a sonic signal; and
   a guide housing enclosing said at least one ultrasonic sensor, said guide housing comprises a first tube adapted to be mounted to a top of a fuel delivery module and a second tube adapted to be mounted to a bottom of the fuel delivery module;
   said at least one ultrasonic sensor adapted to be disposed in one of a liquid fuel and a fuel vapor/air space within the fuel tank to measure a level of liquid fuel within the fuel tank.

2. A fuel level indication assembly as set forth in claim 1 wherein said at least one ultrasonic sensor includes a substrate.

3. A fuel level indication assembly as set forth in claim 2 wherein said substrate is made of a silicon material.

4. A fuel level indication assembly as set forth in claim 2 wherein said at least one ultrasonic sensor includes a support operatively supported on said substrate to support said drum to form a cavity therebetween.

5. A fuel level indication assembly as set forth in claim 4 wherein said support is made of a silicon material.

6. A fuel level indication assembly as set forth in claim 1 wherein said drum comprises a suspended membrane and a conductive metal material disposed over said membrane.

7. A fuel level indication assembly as set forth in claim 6 wherein said conductive metal material is aluminum.

8. A fuel level indication assembly as set forth in claim 6 wherein said conductive metal material is gold.

9. A fuel level indication assembly as set forth in claim 1 wherein said first tube and second tube are telescopingly engaged and have at least one aperture to allow fuel to enter therein.

10. A fuel level indication assembly for a fuel tank comprising:
    a plurality of ultrasonic sensors, each of said ultrasonic sensors having a drum to emit and receive a sonic signal, and
    one of said ultrasonic sensors being adapted to be disposed in a liquid fuel within the fuel tank and another one of said ultrasonic sensors being adapted to be disposed in a
    fuel vapor/air space within the fuel tank to measure a level of the liquid fuel within the
    fuel tank, and a guide housing enclosing at least one ultrasonic sensor, said guide housing comprises a first tube adapted to be mounted to a top of a fuel delivery module and a second tube adapted to be mounted to a bottom of a fuel delivery module.

11. A fuel level indication assembly as set forth in claim 10 wherein each of said ultrasonic sensors include a substrate.

12. A fuel level indication assembly as set forth in claim 11 wherein said substrate is made of a silicon material.

13. A fuel level indication assembly as set forth in claim 11 wherein each of said ultrasonic sensors include a support operatively supported on said substrate to support said drum to form a cavity therebetween.

14. A fuel level indication assembly as set forth in claim 13 wherein said support is made of a silicon material.

15. A fuel level indication assembly as set forth in claim 10 wherein said drum comprises a suspended membrane and a conductive metal material disposed over said membrane.

16. A fuel level indication assembly as set forth in claim 15 wherein said conductive metal material is aluminum.

17. A fuel level indication assembly as set forth in claim 15 wherein said conductive metal material is gold.

18. An assembly comprising:
   a fuel tank;
   a fuel delivery module disposed within said fuel tank and comprising a top and a bottom;
   a guide housing comprising a first tube mounted to the top of the fuel delivery module and a second tube mounted to the bottom of the fuel delivery module; and
   at least one ultrasonic sensor having a drum to emit and receive a sonic signal;
   said at least one ultrasonic sensor disposed in either one of a liquid fuel and a fuel vapor/air space within said fuel tank to measure a level of liquid fuel within said fuel tank.

19. A fuel level indication assembly for a fuel tank comprising: an ultrasonic sensor having a drum to emit and receive a sonic signal; said at least one ultrasonic sensor adapted to be disposed in a liquid fuel within the fuel tank to measure a level of liquid fuel within the fuel tank, and a guide housing to enclose said at least one ultrasonic sensor, wherein said guide housing comprises a first tube adapted to be mounted to a top of a fuel delivery module and a second tube adapted to be mounted to a bottom of the fuel delivery module.

20. A fuel level indication assembly as set forth in claim 19 wherein said first tube and second tube are telescopingly engaged and have at least one aperture to allow fuel to enter therein.

* * * * *